(12) United States Patent
Jang et al.

(10) Patent No.: US 10,347,897 B2
(45) Date of Patent: Jul. 9, 2019

(54) SECONDARY BATTERY WITH ELECTRODE TAB MADE OF COPPER-NICKEL ALLOY

(71) Applicant: LG CHEM, LTD., Seoul (KR)

(72) Inventors: Wook Hee Jang, Daejeon (KR); Yong Ro Lee, Daejeon (KR); Hyung Seok Han, Daejeon (KR); Hyang Mok Lee, Daejeon (KR); Sang Sok Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 274 days.

(21) Appl. No.: 15/023,946

(22) PCT Filed: Jul. 16, 2014

(86) PCT No.: PCT/KR2014/006417
§ 371 (c)(1),
(2) Date: Mar. 22, 2016

(87) PCT Pub. No.: WO2015/046726
PCT Pub. Date: Apr. 2, 2015

(65) Prior Publication Data
US 2016/0248071 A1    Aug. 25, 2016

(30) Foreign Application Priority Data

Sep. 27, 2013 (KR) .................. 10-2013-0115202

(51) Int. Cl.
*H01M 2/22* (2006.01)
*H01M 2/26* (2006.01)
(Continued)

(52) U.S. Cl.
CPC ............ *H01M 2/263* (2013.01); *H01M 2/22* (2013.01); *H01M 10/0431* (2013.01); *H01M 10/0525* (2013.01); *H01M 10/0587* (2013.01)

(58) Field of Classification Search
CPC .... H01M 2/22; H01M 2/263; H01M 10/0431; H01M 10/0525; H01M 10/0587
(Continued)

(56) References Cited

U.S. PATENT DOCUMENTS

| 5,856,047 A | 1/1999 | Venkatesan et al. |
| 2002/0192554 A1 * | 12/2002 | Woo ............ H01M 4/131 429/231.8 |

(Continued)

FOREIGN PATENT DOCUMENTS

| CN | 103988339 A | 8/2014 |
| EP | 2 154 257 A1 | 2/2010 |

(Continued)

OTHER PUBLICATIONS

Sato et al., Machine translation of JP 2003-100278 A, Apr. 2003 (Year: 2003).*

(Continued)

*Primary Examiner* — Sean P Cullen
(74) *Attorney, Agent, or Firm* — Birch, Stewart, Kolasch & Birch, LLP

(57) ABSTRACT

Disclosed herein is a secondary battery configured to have a structure in which an electrode assembly of a cathode/separator/anode structure is mounted in a battery case in a state in which the electrode assembly is impregnated with an electrolyte, wherein electrode tabs are attached to active material uncoated portions of electrode plates of the electrode assembly and an anode tab, which is one of the electrode tabs and one end of which is attached to a battery case, is made of a Cu—Ni alloy.

15 Claims, 3 Drawing Sheets

(51) Int. Cl.
  *H01M 10/04*     (2006.01)
  *H01M 10/0525*   (2010.01)
  *H01M 10/0587*   (2010.01)

(58) Field of Classification Search
  USPC .......................................................... 429/178
  See application file for complete search history.

(56) References Cited

U.S. PATENT DOCUMENTS

| | | | | |
|---|---|---|---|---|
| 2009/0081532 | A1* | 3/2009 | Kaplin | H01M 2/02 429/94 |
| 2010/0086435 | A1 | 4/2010 | Era | |
| 2010/0273033 | A1* | 10/2010 | Fujikawa | H01M 2/263 429/61 |
| 2010/0330427 | A1* | 12/2010 | Kogetsu | H01M 2/22 429/220 |
| 2012/0251860 | A1* | 10/2012 | Marple | H01M 4/381 429/94 |
| 2013/0316207 | A1* | 11/2013 | Suwa | H01M 10/05 429/94 |
| 2014/0072851 | A1 | 3/2014 | Oh et al. | |

FOREIGN PATENT DOCUMENTS

| | | | |
|---|---|---|---|
| EP | 2 772 964 A1 | 9/2014 | |
| JP | 11-86868 A | 3/1999 | |
| JP | 2003-100278 A | 4/2003 | |
| JP | 2004-127599 A | 4/2004 | |
| JP | 2010-541131 A | 12/2010 | |
| JP | 5140171 B2 | 2/2013 | |
| KR | 10-0426881 B1 | 4/2004 | |
| KR | 10-2005-0018268 A | 2/2005 | |
| KR | 10-2010-0078841 A | 7/2010 | |
| KR | 10-2012-0105823 A | 9/2012 | |
| KR | 10-2013-0091086 A | 8/2013 | |
| KR | 10-2013-0093875 A | 8/2013 | |
| WO | WO 2009/038705 A1 | 3/2009 | |
| WO | WO-2012105362 A1 * | 8/2012 | ............ H01M 10/05 |
| WO | WO 2012/147425 A1 | 11/2012 | |
| WO | WO 2013/118982 A1 | 8/2013 | |

OTHER PUBLICATIONS

International Search Report, issued in PCT/KR2014/006417, dated Oct. 22, 2014.

* cited by examiner

[FIG. 1]
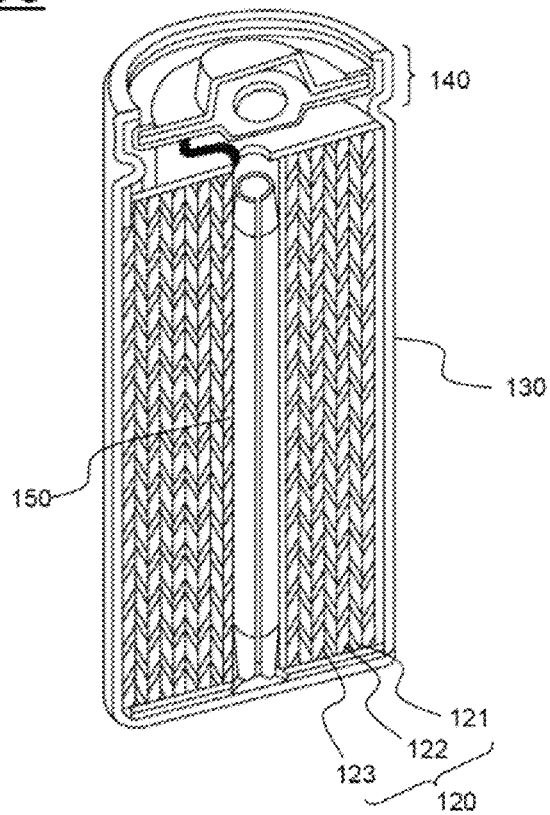

[FIG. 2]
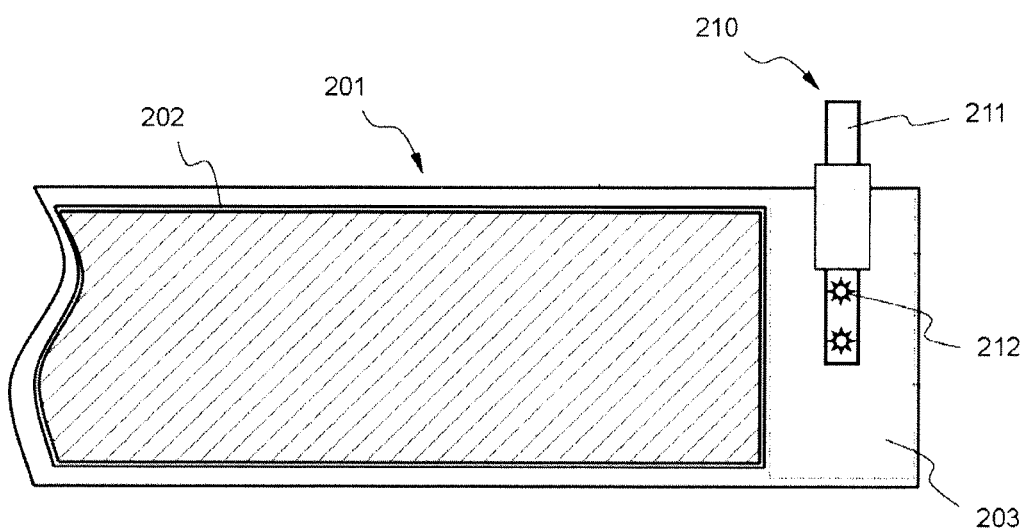
[FIG. 3]
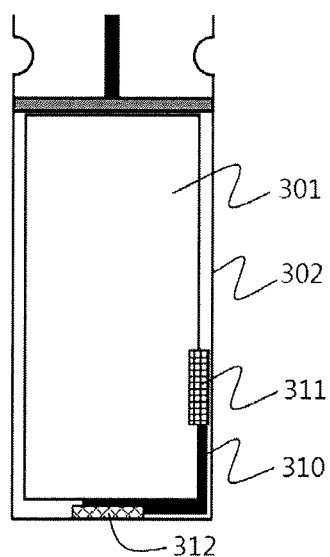

[FIG. 4]
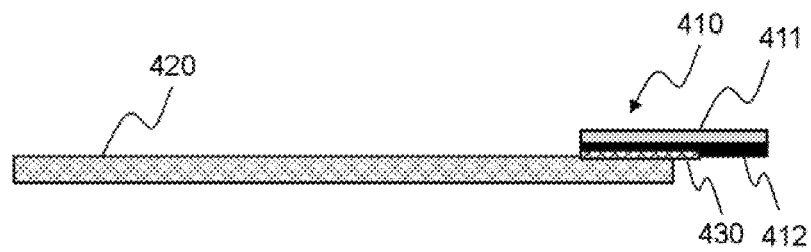
[FIG. 5]
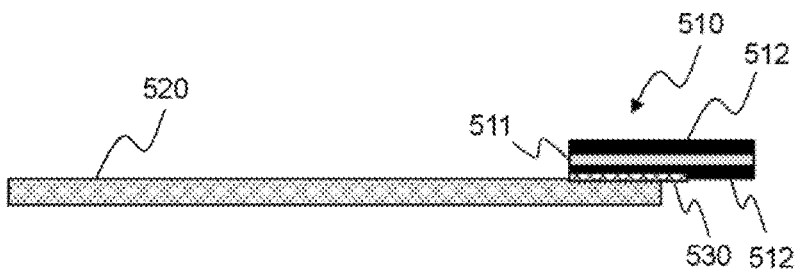

SECONDARY BATTERY WITH ELECTRODE TAB MADE OF COPPER-NICKEL ALLOY

TECHNICAL FIELD

The present invention relates to a secondary battery including a low-resistance electrode tab.

BACKGROUND ART

Based on the shape of a battery case, a secondary battery, the demand for which has increased in recent years, may be classified as a cylindrical battery having an electrode assembly mounted in a cylindrical metal can, a prismatic battery having an electrode assembly mounted in a prismatic metal can, or a pouch-shaped battery having an electrode assembly mounted in a pouch-shaped case made of an aluminum laminate sheet. The cylindrical battery has advantages in that the cylindrical battery has relatively large capacity and is structurally stable.

The electrode assembly mounted in the battery case serves as a power generating element, having a cathode/separator/anode stack structure, which can be charged and discharged. The electrode assembly may be classified as a jelly roll type electrode assembly configured to have a structure in which a long sheet type cathode and a long sheet type anode, to which active materials are applied, are wound in a state in which a separator is disposed between the cathode and the anode or a stacked type electrode assembly configured to have a structure in which a plurality of cathodes having a predetermined size and a plurality of anodes having a predetermined size are sequentially stacked in a state in which separators are disposed respectively between the cathodes and the anodes. The jelly roll type electrode assembly has advantages in that the jelly roll type electrode assembly is easy to manufacture and has high energy density per weight.

In connection with the above, a vertical sectional perspective view of a conventional cylindrical battery is typically shown in FIG. 1.

Referring to FIG. 1, the cylindrical battery 100 is manufactured by mounting a jelly roll type (wound type) electrode assembly 120 in a cylindrical can 130, injecting an electrolyte into the cylindrical can 130, and coupling a top cap 140 having an electrode terminal (for example, a cathode terminal, which is not shown) to the upper end, which is open, of the cylindrical can 130.

The electrode assembly 120 is configured to have a structure in which a cathode 121 and an anode 122 are wound in a circle in a state in which a separator 123 is disposed between the cathode 121 and the anode 122. A cylindrical center pin 150 is fitted in the core of the electrode assembly 120 (the center of the jelly roll). The center pin 150 is generally made of a metal material to exhibit predetermined strength. The center pin 150 is configured to have a hollow cylindrical structure formed by rolling a sheet type material. The center pin 150 serves to fix and support the electrode assembly. In addition, the center pin 150 serves as a passage to discharge gas generated due to internal reaction of the battery when charging and discharging the battery and when operating the battery.

In recent years, however, a problem related to heat generated from the secondary battery due to high-performance operation of the secondary battery has become more serious.

Heat generated from the secondary battery causes decomposition of a cathode active material and an electrolyte. As a result, a plurality of side reactions may rapidly progress and, in the end, the secondary battery may catch fire or explode.

It has been proved that such a phenomenon occurs at an electrode tab upon which current is concentrated during charge and discharge of the battery and, in particular, is serious for an anode tab.

A conventional anode tab is made of a single material, such as nickel, and has a single size. In order to solve the heat-related problem, the anode tab may be made of copper, which has lower resistance than nickel. However, it is difficult to secure easiness in welding between the anode tab made of copper and an electrode foil as a current collector or a battery case. For this reason, it is difficult to manufacture the anode tab using copper.

Therefore, there is a high necessity for technology to fundamentally solve the above problems.

DISCLOSURE

Technical Problem

Therefore, the present invention has been made to solve the above problems, and other technical problems that have yet to be resolved.

The inventors of the present application have found that in a case in which one of electrode tabs attached to active material uncoated portions of electrode plates of an electrode assembly, e.g. an anode tab, one end of which is attached to a battery case, is made of a Cu—Ni alloy, it is possible to reduce resistance of a secondary battery and heat generated from the secondary battery. The present invention has been completed based on these findings.

Technical Solution

In accordance with one aspect of the present invention, there is provided a secondary battery configured to have a structure in which an electrode assembly of a cathode/separator/anode structure is mounted in a battery case in a state in which the electrode assembly is impregnated with an electrolyte, wherein electrode tabs are attached to active material uncoated portions of electrode plates of the electrode assembly and an anode tab, which is one of the electrode tabs and one end of which is attached to a battery case, is made of a Cu—Ni alloy.

In the secondary battery according to the present invention, the anode tab is made of the Cu—Ni alloy as described above. The anode tab made of the Cu—Ni alloy has higher conductivity than an anode tab made of nickel. As a result, resistance of the anode tab is reduced based on the same area and the same length. Consequently, it is possible to reduce heat generated from the anode tab during the use of the secondary battery, thereby improving safety of the secondary battery. In addition, it is possible to prevent lose of current flowing in the secondary battery due to the reduction of the resistance of the anode tab, thereby improving operation efficiency of the secondary battery. In addition to reduction of heat generated from the anode tab, it is possible to weld corresponding portions of the secondary battery at a desired level.

The battery case may be a cylindrical can or a prismatic can. However, the present invention is not limited thereto.

In a concrete example, the electrode assembly may be a jelly roll configured to have a structure in which a cathode and an anode manufactured by applying an electrode active material to opposite surfaces of a long sheet of metal foil is wound in a circle in a state in which a separator is disposed between the cathode and the anode.

In a concrete example, a Ni content of the anode tab made of the Cu—Ni alloy may be 0.05% to 3% based upon the total weight of the alloy.

In another concrete example, the Cu—Ni alloy constituting the anode tab may further contain at least one element selected from Si and Sn in addition to Cu and Ni to improve mechanical strength of the anode tab.

Tin exhibits higher strength and lower resistance than nickel. Silicon exhibits higher strength than nickel. Furthermore, resistance of silicon lowers as temperature of silicon increases, which is one of the characteristics of a semiconductor. For these reasons, tin and silicon are preferably used for the secondary battery.

In this case, a content of Si may be 0.05% to 0.80% based upon the total weight of the alloy and a content of Sn may be 0.10% to 0.70% based upon the total weight of the alloy. The content of Si or Sn may be freely adjusted within the above-defined range according to desired physical properties.

In a concrete example, the anode tab may be attached to a lower end of an inside of the battery case.

For example, a winding start portion of the anode may not be provided with an anode uncoated portion but a winding end portion of the anode may be provided with an anode uncoated portion, to which the anode tab is attached. The anode tab may be coupled to the anode uncoated portion and the lower end of the inside of the battery case by welding.

The welding is not particularly restricted so long as the anode tab is securely attached to the anode uncoated portion and the lower end of the inside of the battery case while physical properties of the anode tab and components constituting the secondary battery are not changed. For example, the welding may be at least one selected from among arc welding, resistance welding, and ultrasonic welding.

In a concrete example, the anode tab may be attached to a corresponding one of the electrode plates by ultrasonic welding and one end of the anode tab may be attached to the inside of the battery case by resistance welding.

The anode tab of the secondary battery according to the present invention exhibits excellent weldability even in a case in which such different welding methods are used.

Meanwhile, the anode tab may be formed of a strip-shaped member having a width of 2 mm to 8 mm, a length of 10 mm to 90 mm, and a thickness of 0.05 mm to 0.5 mm. However, the present invention is not limited thereto.

In another embodiment of the present invention, the anode tab may be configured to have a structure in which a plurality of layers made of different materials is stacked in addition to the single Cu—Ni alloy layer as described above.

In a concrete example, the anode tab may be configured to have a structure in which a Cu—Ni alloy layer and a copper layer are stacked. Copper is not easily attached to the electrode or the battery case by welding. For this reason, the anode tab may be configured to have a two-layer structure in which one layer attached to a corresponding one of the electrode plates is a Cu—Ni alloy layer and the other layer stacked on the Cu—Ni alloy layer is a copper layer. In a case in which the Cu—Ni alloy layer exhibiting high weldability is located on the electrode and the copper layer having lower resistance than nickel is located on the Cu—Ni alloy layer as described above, it is possible to solve a safety-related problem due to heat generated from the anode tab and, in addition, to improve adhesive strength when the anode tab is attached to a corresponding one of the electrode plates by welding.

In another concrete example, the anode tab may be configured to have a three-layer structure in which an upper Cu—Ni alloy layer and a lower Cu—Ni alloy layer are stacked in a state in which a copper layer is disposed between the upper Cu—Ni alloy layer and the lower Cu—Ni alloy layer. In this case, it is possible to solve difficulty in welding caused when the anode tab is attached to the battery case as well as when the anode tab is attached to a corresponding one of the electrode plates.

In a case in which the anode tab is configured to have the two-layer structure or the three-layer structure instead of the single Cu—Ni alloy layer as described above, it is possible to more widely adjust the content ranges of Cu and Ni and, therefore, to improve adhesive strength of the anode tab such that welding of the anode tab can be easily achieved.

The Cu—Ni alloy constituting the anode tab configured to have the two-layer structure or the three-layer structure may further contain at least one element selected from Si and Sn. Sn exhibits higher strength and lower resistance than Ni. Si exhibits higher strength than Ni. Furthermore, resistance of Si lowers as temperature of Si increases, which is one of the characteristics of a semiconductor. For these reasons, Sn and Si are preferably used for the secondary battery. In addition, the copper layer may further contain an element different from copper as needed.

In this case, a content of Si may be 0.05% to 0.80% based upon the total weight of the alloy and a content of Sn may be 0.10% to 0.70% based upon the total weight of the alloy. The content of Si or Sn may be freely adjusted within the above-defined range according to desired physical properties.

The secondary battery may be a lithium secondary battery. Components constituting such a lithium secondary battery and a method of manufacturing the same are well known in the art to which the present invention pertains, and a detailed description thereof will be omitted.

In accordance with other aspects of the present invention, there are provided a battery pack including the lithium secondary battery as a unit cell and a device including the battery pack as a power source.

Specifically, the battery pack may be used as a power source of a device requiring safety against high temperature, long cycle and high rate characteristics, etc. For example, the device may be selected from among a mobile electronic device, a power tool driven by a battery-based motor, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system, to which, however, the present invention is not limited.

The structure and manufacturing method of the above-mentioned devices are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a vertical sectional view typically showing a conventional cylindrical battery cell;

FIG. 2 is a partial view typically showing an anode of an electrode assembly according to an embodiment of the present invention;

FIG. 3 is a see-through view typically showing a cylindrical battery cell including the electrode assembly of FIG. 2;

FIG. 4 is a side view typically showing an anode tab according to another embodiment of the present invention; and FIG. 5 is a side view typically showing an anode tab according to a further embodiment of the present invention.

BEST MODE

Now, preferred embodiments of the present invention will be described in detail with reference to the accompanying drawings. It should be noted, however, that the scope of the present invention is not limited by the illustrated embodiment.

FIG. 2 is a partial view typically showing an anode of an electrode assembly according to an embodiment of the present invention.

Referring to FIG. 2, an anode 201 includes an anode active material coated portion, to which an anode active material 202 is applied, and an anode active material uncoated portion 203, to which the anode active material 202 is applied.

One end of an anode tab 210 made of a Cu—Ni alloy is attached to the anode active material uncoated portion 203 by welding 212. The other end 211 of the anode tab 210 may be attached to the inside of a battery case by resistance welding.

FIG. 3 is a see-through view typically showing a cylindrical battery cell including the electrode assembly of FIG. 2

Referring to FIG. 3, a cylindrical battery cell 300 is configured to have a structure in which a jelly roll type electrode assembly 301 is mounted in a battery case 302.

Specifically, the cylindrical battery cell 300 is configured to have a structure in which one end of an anode tab 310 is attached to an anode active material uncoated portion of an anode constituting the electrode assembly 301 by ultrasonic welding 311 and the other end of the anode tab 310 is attached to the lower end of the inside of the battery case 302 by resistance welding 312.

FIGS. 4 and 5 are typical views showing anode tabs attached to electrode plates according to other embodiments of the present invention when viewed from the side. Referring to FIG. 4, one end of an anode tab 410 is attached to one end of an electrode plate 420 by ultrasonic welding 430. The anode tab 410 is configured to have a structure in which two layers made of different materials are stacked. One layer 412 attached to the electrode plate is made of a Cu—Ni alloy exhibiting high adhesive strength based on welding. The other layer 411 stacked on the layer 412 is made of copper.

Referring to FIG. 5, on the other hand, an anode tab 510 is configured to have a structure in which three layers made of different materials are stacked. Specifically, one end of the anode tab 510 is attached to one end of an electrode plate 520 by ultrasonic welding 530 and the anode tab 510 is configured to have a structure in which an upper Cu—Ni alloy layer 512 and a lower Cu—Ni alloy layer 512 are stacked in a state in which a copper layer 511 is disposed between the upper Cu—Ni alloy layer 512 and the lower Cu—Ni alloy layer 512. In a case in which the anode tab with the above-stated construction is used, the resistance of the anode tab is reduced with the result that it is possible to prevent problems caused due to overheating and, in addition, to solve process-related problems caused due to low coupling force when the anode tab is attached to the electrode plate or the battery case.

Hereinafter, the present invention will be described in more detail based on examples; however, the following examples are given only to illustrate the present invention and, therefore, the scope of the present invention is not limited to the following examples.

EXAMPLE 1

An anode tab having a width of 4 mm, a length of 50 mm, and a thickness of 0.1 mm was manufactured using a Cu—Ni alloy consisting of 97% of Cu, 2% of Ni, 0.5% of Si, and 0.5% of Sn in element ratio.

EXAMPLE 2

An anode active material was applied to opposite surfaces of an anode current collector excluding an anode tab attachment portion of the anode current collector and then one end of the anode tab manufactured according to Example 1 was attached to an anode active material uncoated portion by ultrasonic welding to manufacture an anode and to manufacture a jelly roll type electrode assembly including the anode. The electrode assembly was inserted into a cylindrical battery case and then the other end of the anode tab was attached to the lower end of the inside of the battery case by resistance welding to manufacture a cylindrical secondary battery.

COMPARATIVE EXAMPLE 1

An anode tab was manufactured according to the same method as in Example 1 except that the anode tab was made of Ni (having a content of more than 99%).

COMPARATIVE EXAMPLE 2

A cylindrical secondary battery was manufactured according to the same method as in Example 2 except that the anode tab manufactured according to Comparative example 1 was used.

EXPERIMENTAL EXAMPLE 1

Resistance of the anode tabs manufactured according to Example 1 and Comparative example 1 was measured using an ohmmeter. Specifically, resistance flowing in the anode tabs was measured several times. The maximum value, the minimum value, and the average value of the measured experimental values of resistance are indicated in Table 1 below.

TABLE 1

| Classification (mΩ) | Comparative example 1 | Example 1 (Cu—Ni alloy) | Reduced amount | Measurement basis (mm) |
| --- | --- | --- | --- | --- |
| Average value | 11.09 | 6.61 | −4.48 (40.4%) | 4 (W) × 0.1 (T) × 50 (L) |
| Maximum value | 11.22 | 6.76 | −4.46 (39.8%) | |
| Minimum value | 10.89 | 6.50 | −4.39 (40.3%) | |

It can be seen from Table 1 that the resistance of the anode tab containing Cu of Example 1 is greatly lower than the resistance of the anode tab containing only Ni of Comparative example 1. This reveals that the anode tab containing Cu exhibits higher conductivity than the anode tab containing only Ni and, therefore, has effects in that the resistance of the anode tab is reduced, deterioration of the battery is prevented, and safety and operation efficiency of the anode tab are improved.

EXPERIMENTAL EXAMPLE 2

Resistance of the cylindrical secondary batteries manufactured according to Example 2 and Comparative example 2 was measured using an ohmmeter. For reference, cathodes were manufactures using cathode tabs made of Ni. Specifically, resistance flowing in the cylindrical secondary batteries was measured several times. The maximum value, the minimum value, and the average value of the measured experimental values of resistance are indicated in Table 1 below.

TABLE 2

| Classification of anode tabs | Comparative example 2 Ni (2 EA) | Example 2 Ni (1 EA) and Cu—Ni (1 EA) | Reduced amount |
| --- | --- | --- | --- |
| Average value (mΩ) | 11.29 | 10.66 | −0.63 (5.57%) |
| Maximum value (mΩ) | 11.46 | 10.81 | −0.65 (5.67%) |
| Minimum value (mΩ) | 11.02 | 10.46 | −0.56 (5.08%) |

It can be seen from Table 2 that the resistance of the secondary battery including the anode tab containing Cu of Example 2 is greatly lower than the resistance of the secondary battery including the anode tab containing only Ni of Comparative example 2.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a secondary battery according to the present invention is characterized in that an anode tab, one end of which is attached to a battery case, is made of a Cu—Ni alloy. As a result, heat generated from the anode tab is greatly reduced due to relatively high conductivity of the anode tab. Consequently, it is possible to improve safety of the secondary battery. In addition, loss of current is prevented. Consequently, it is possible to improve operation efficiency of the secondary battery.

The invention claimed is:

1. A secondary battery configured to have a structure in which an electrode assembly of a cathode/separator/anode structure is mounted in a battery case in a state in which the electrode assembly is impregnated with an electrolyte, wherein electrode tabs are attached to active material uncoated portions of electrode plates of the electrode assembly, and an anode tab, which is one of the electrode tabs and one end of which is attached to the battery case, is made of a Cu—Ni alloy, wherein the anode tab is configured to have a two-layer structure in which one layer attached to a corresponding one of the electrode plates is a Cu—Ni alloy layer and the other layer stacked on the Cu—Ni alloy layer is a copper layer, and wherein a Ni content of the Cu—Ni alloy is 0.05% to 3% based upon the total weight of the alloy.

2. The secondary battery according to claim 1, wherein the battery case is a cylindrical can.

3. The secondary battery according to claim 1, wherein the anode tab is attached to a lower end of an inside of the battery case.

4. The secondary battery according to claim 1, wherein the Cu—Ni alloy further contains at least one element selected from Si and Sn.

5. The secondary battery according to claim 1, wherein a content of Si is 0.05% to 0.80% based upon the total weight of the alloy, and a content of Sn is 0.10% to 0.70% based upon the total weight of the alloy.

6. The secondary battery according to claim 1, wherein the anode tab is formed of a strip-shaped member having a width of 2 mm to 8 mm, a length of 10 mm to 90 mm, and a thickness of 0.05 mm to 0.5 mm.

7. The secondary battery according to claim 1, wherein the electrode assembly is a jelly roll configured to have a structure in which a cathode sheet and an anode sheet are wound in a state in which a separator is disposed between the cathode sheet and the anode sheet.

8. The secondary battery according to claim 1, wherein the anode tab is attached to the corresponding one of the electrode plates by ultrasonic welding, and one end of the anode tab is attached to an inside of the battery case by resistance welding.

9. The secondary battery according to claim 1, wherein the secondary battery is a lithium secondary battery.

10. A battery pack comprising the lithium secondary battery according to claim 9 as a unit cell.

11. A device comprising the battery pack according to claim 10 as a power source.

12. The device according to claim 11, wherein the device is selected from a group consisting of a mobile electronic device, an electric vehicle, a hybrid electric vehicle, a plug-in hybrid electric vehicle, and a power storage device.

13. A secondary battery configured to have a structure in which an electrode assembly of a cathode/separator/anode structure is mounted in a battery case in a state in which the electrode assembly is impregnated with an electrolyte, wherein electrode tabs are attached to active material uncoated portions of electrode plates of the electrode assembly, and an anode tab, which is one of the electrode tabs and one end of which is attached to the battery case, is made of a Cu—Ni alloy, wherein the anode tab is configured to have a three-layer structure in which an upper Cu—Ni alloy layer and a lower Cu—Ni alloy layer are stacked in a state in which a copper layer is disposed between the upper Cu—Ni alloy layer and the lower Cu-Ni alloy layer, and wherein a Ni content of the Cu—Ni alloy is 0.05% to 3% based upon the total weight of the alloy.

14. The secondary battery according to claim 13, wherein the Cu—Ni alloy further contains at least one element selected from Si and Sn.

15. The secondary battery according to claim 14, wherein a content of Si is 0.05% to 0.80% based upon the total weight of the alloy and a content of Sn is 0.10% to 0.70% based upon the total weight of the alloy.

\* \* \* \* \*